US012801940B2

(12) United States Patent
Lee et al.

(10) Patent No.: US 12,801,940 B2
(45) Date of Patent: Nov. 17, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jaehun Lee, Suwon-si (KR); Byungho Kim, Suwon-si (KR); Sungmin Yi, Suwon-si (KR); Jeongdong Hwang, Suwon-si (KR); Byunghyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 962 days.

(21) Appl. No.: 18/060,284

(22) Filed: Nov. 30, 2022

(65) Prior Publication Data

US 2023/0169357 A1 Jun. 1, 2023

(30) Foreign Application Priority Data

Dec. 1, 2021 (KR) ........................ 10-2021-0169866

(51) Int. Cl.
*G06N 5/02* (2023.01)
*G06F 18/22* (2023.01)

(52) U.S. Cl.
CPC ............... *G06N 5/02* (2013.01); *G06F 18/22* (2023.01)

(58) Field of Classification Search
CPC ................................. G06N 5/02; G06F 18/22
See application file for complete search history.

(56) References Cited

U.S. PATENT DOCUMENTS 9,208,223 B1 12/2015 Patil et al.
11,874,885 B2 1/2024 Jeong et al.
2017/0039480 A1* 2/2017 Bitran ...................... A61B 5/01

FOREIGN PATENT DOCUMENTS

JP 2017-151863 8/2017
KR 10-2008-0043425 5/2008

(Continued)

OTHER PUBLICATIONS

Cao, Yixin, et al. "Unifying knowledge graph learning and recommendation: Towards a better understanding of user preferences." The world wide web conference. 2019. (Year: 2019).*

(Continued)

*Primary Examiner* — Kevin W Figueroa
(74) *Attorney, Agent, or Firm* — NIXON & VANDERHYE P.C.

(57) ABSTRACT

An electronic apparatus is disclosed. The electronic apparatus includes: a communication interface comprising communication circuitry, a memory including a knowledge graph including a plurality of knowledge data and at least one command, and a processor connected with the memory and configured to control the electronic apparatus, wherein the processor is configured, by executing the at least one command, to: receive user data from at least one external apparatus through the communication interface, identify whether a user behavior occurred based on the user data, based on identifying the user behavior, acquire context information related to the user behavior, identify first knowledge data indicating relevance among information on the user behavior, the context information, and personalized information stored in the memory, and compare the first knowledge data and second knowledge data included in the knowledge graph included in the memory and update the knowledge graph, wherein the first knowledge data and the second knowledge data include at least one entity informa- (Continued)

tion of the knowledge graph and information regarding a relation between the at least one entity information.

13 Claims, 11 Drawing Sheets

(56) References Cited

FOREIGN PATENT DOCUMENTS

| | | |
|---|---|---|
| KR | 10-2163323 | 10/2020 |
| KR | 10-2021-0033770 | 3/2021 |
| WO | 2017/222354 | 12/2017 |

OTHER PUBLICATIONS

Wenige, Lisa, and Johannes Ruhland. "Similarity-based knowledge graph queries for recommendation retrieval." Semantic web 10.6 (2019): 1007-1037. (Year: 2019).*

Mezni, Haithem, Djamal Benslimane, and Ladjel Bellatreche. "Context-aware service recommendation based on knowledge graph embedding." IEEE Transactions on Knowledge and Data Engineering 34.11 (2021): 5225-5238. (Year: 2021).*

Office Action for KR Application No. 10-2021-0169866 issued Jul. 30, 2026 and English translation, 14 pages.

* cited by examiner

ELECTRONIC APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2021-0169866, filed on Dec. 1, 2021, in the Korean Intellectual Property Office, the disclosure of which is incorporated by reference herein in its entirety.

BACKGROUND

Field

The disclosure relates to an electronic apparatus and a controlling method thereof, and for example, to an electronic apparatus that updates a knowledge graph using user data, and a controlling method thereof.

Description of Related Art

In a conventional method of generating a knowledge graph, a vast amount of data cannot be stored, and thus a knowledge graph is updated by a method of deleting the past data, and storing the recent data. In this case, there is a problem that knowledge data that is acquired according to long-term observation cannot be made as a knowledge graph.

Also, in a conventional method of generating a knowledge graph, an electronic apparatus transmits knowledge data for generating a knowledge graph to an external server, and a knowledge graph is generated at the server. In this case, sensitive personal information cannot be transmitted to an external server, and thus there is a problem that a personalized knowledge graph using personalized information cannot be generated when generating a knowledge graph.

SUMMARY

Embodiments of the disclosure provide an electronic apparatus that selectively identifies user data acquired at the electronic apparatus and identifies knowledge data using lightweight data, and generates and updates a knowledge graph using personalized information stored within the electronic apparatus, and a controlling method thereof.

An electronic apparatus according to an example embodiment of the disclosure includes: a communication interface comprising communication circuitry, a memory including a knowledge graph including a plurality of knowledge data and at least one command, and a processor connected with the memory and configured to control the electronic apparatus, wherein the processor is configured, by executing the at least one command, to: receive user data from at least one external apparatus through the communication interface, identify whether a user behavior occurred based on the user data, based on identifying the user behavior, acquire context information related to the user behavior, identify first knowledge data indicating relevance among information on the user behavior, the context information, and personalized information in the memory, and compare the first knowledge data and second knowledge data included in the knowledge graph in the memory and update the knowledge graph, wherein the first knowledge data and the second knowledge data may include at least one entity information n comprising the knowledge graph and information regarding a relation between the at least one entity.

The processor may be configured to: identify a pattern of the user data, identify data having a different pattern from the pattern of the user data as data related to the user behavior, and identify whether the user behavior occurred based on the data related to the user behavior.

The processor may, based on identifying that the pattern of the first knowledge data corresponds to the pattern of the second knowledge data, be configured to update the second knowledge data using information not included in the second knowledge data among the information included in the first knowledge data.

The processor may, based on identifying that pattern of the first knowledge data and pattern of the second knowledge data do not correspond, be configured to apply a weight to the first knowledge data.

The processor may be configured to: identify new entity information for an attribute not included in the second knowledge data, update the first knowledge data using the new entity information, and apply a weight to the updated first knowledge data based on number of times that knowledge data of the same pattern as the updated first knowledge data was acquired.

The electronic apparatus may further include a user interface comprising interface circuitry, and the processor may be configured to: receive input of a threshold value through the user interface, and based on the weight being greater than or equal to the threshold value, add the updated first knowledge data to the knowledge graph.

The knowledge graph may store the plurality of knowledge data in a semantic form.

The processor may be configured to provide recommendation information based on the knowledge graph and the context information.

A method of controlling an electronic apparatus according to an example embodiment of the disclosure includes: receiving user data from at least one external apparatus, identifying whether a user behavior occurred based on the user data, based on identifying the user behavior, acquiring context information related to the user behavior, identifying first knowledge data indicating relevance among information on the user behavior, the context information, and personalized information stored in the electronic apparatus, and comparing the first knowledge data and second knowledge data included in the knowledge graph included in the electronic apparatus and updating the knowledge graph, wherein the first knowledge data and the second knowledge data may include at least one entity information comprising the knowledge graph and information regarding a relation between the at least one entity.

The identifying whether a user behavior occurred may include, identifying a pattern of the user data, identifying data having a different pattern from the pattern of the user data as data related to the user behavior, and identifying whether the user behavior occurred based on the data related to the user behavior.

The updating the knowledge graph may include, based on identifying that the pattern of the first knowledge data corresponds to the pattern of the second knowledge data, updating the second knowledge data using information not included in the second knowledge data among the information included in the first knowledge data.

The updating the knowledge graph, based on identifying that pattern of the first knowledge data and pattern of the second knowledge data do not correspond, may include applying a weight to the first knowledge data.

The updating the knowledge graph may include, identifying new entity information for an attribute not included in the second knowledge data, updating the first knowledge data using the new entity information, and applying a weight to the updated first knowledge data based on the number of times that knowledge data of the same pattern as the updated first knowledge data was acquired.

The method may further include receiving an input of a threshold value from a user.

By identifying lightweight data and generating knowledge data, and updating a knowledge graph through various example embodiments, a user behavior pattern observed for a long period of time can be made as a knowledge graph.

By generating and updating a knowledge graph using personalized information stored in an electronic apparatus according to various example embodiments, a user behavior pattern knowledge graph optimized/improved for the user of the electronic apparatus can be generated and updated. Further, using a knowledge graph optimized/improved for the user, a customized recommendation service can be provided to the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
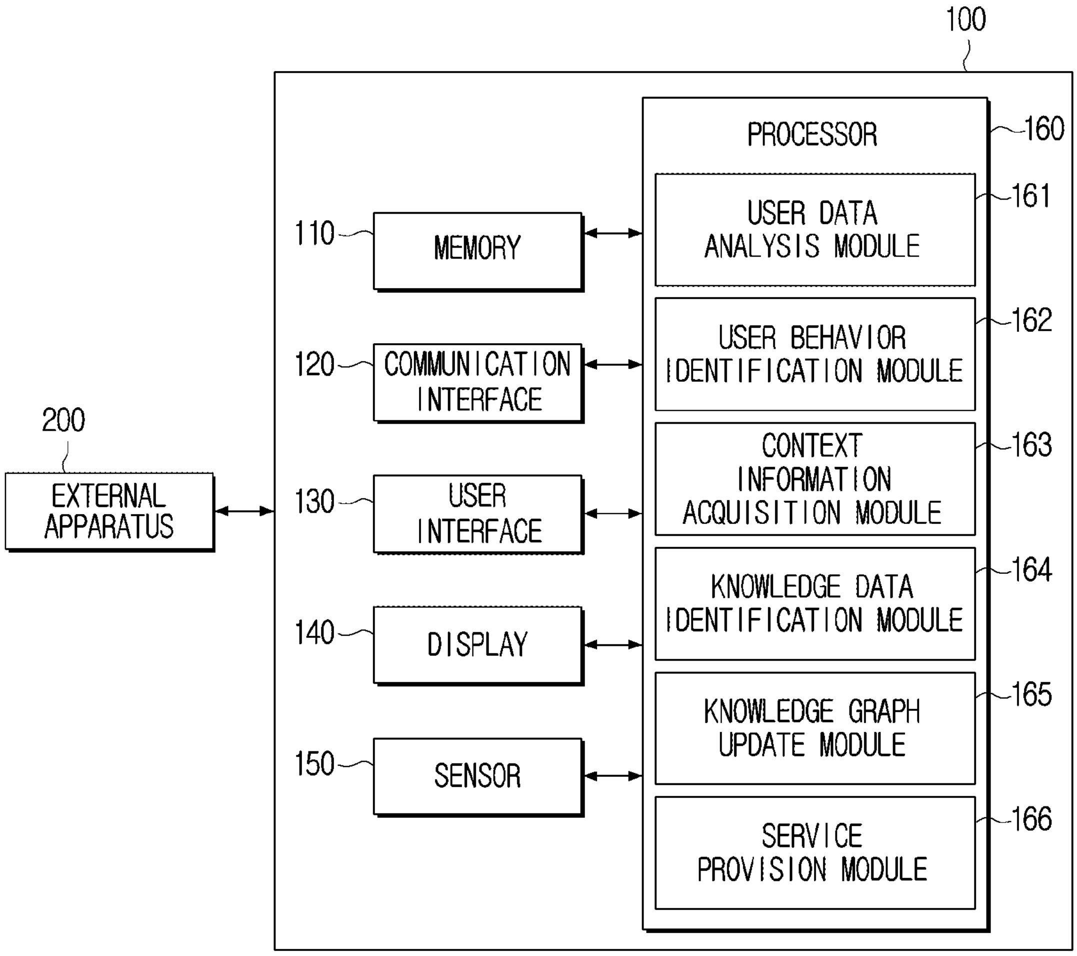
FIG. 1 is a block diagram illustrating an example configuration of an electronic apparatus according to various embodiments.

Various modifications may be made to the various example embodiments of the disclosure. Accordingly, various example embodiments will be illustrated in drawings, and the embodiments will be described in greater detail in the disclosure. However, it should be noted that the various embodiments do not limit the scope of the disclosure to a specific embodiment, but they should be interpreted to include all modifications, equivalents, and/or alternatives of the embodiments of the disclosure. Also, with respect to the detailed description of the drawings, similar components may be designated by similar reference numerals.

Further, in describing the disclosure, in case it is determined that detailed explanation of related known functions or features may unnecessarily confuse the gist of the disclosure, the detailed explanation may be omitted.

In addition, the embodiments below may be modified in various different forms, and the scope of the technical idea of the disclosure is not limited to the embodiments below. Rather, these embodiments are provided to make the disclosure more sufficient and complete, and to convey the technical idea of the disclosure to those skilled in the art.

Terms used in the disclosure are used to explain specific embodiments and/or features, and are not intended to limit the scope of the disclosure. Further, singular expressions include plural expressions, unless clearly different in context.

In the disclosure, expressions such as "have," "may have," "include," and "may include" denote the existence of such characteristics (e.g.: elements such as numbers, functions, operations, and components), and do not exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

The expressions "first," "second," and the like used in the disclosure may describe various elements regardless of any order and/or degree of importance. Further, such expressions are used simply to distinguish one element from another element, and are not intended to limit the elements.

In addition, the description in the disclosure that one element (e.g.: a first element) is "(operatively or communicatively) coupled with/to" or "connected to" another element (e.g.: a second element) should be understood to include both the case where the one element is directly coupled to the another element, and the case where the one element is coupled to the another element through still another element (e.g.: a third element).

When one element (e.g.: a first element) is "directly coupled" or "directly connected" to another element (e.g.: a second element), it may be understood that still another element (e.g.: a third element) does not exist between the one element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to an apparatus being "specifically designed to" in terms of hardware.

Under some circumstances, the expression "an apparatus configured to" may refer, for example, to the apparatus being "capable of" performing an operation together with another apparatus or component. For example, the phrase "a processor configured to perform A, B, and C" may refer, for example, to a dedicated processor (e.g.: an embedded processor) for performing the corresponding operations, or a generic-purpose processor (e.g.: a CPU or an application processor) that can perform the corresponding operations by executing one or more software programs stored in a memory device.

In the embodiments of the disclosure, 'a module' or 'a part' may perform at least one function or operation, and may be implemented as hardware or software, or as a combination of hardware and software. A plurality of 'modules' or 'parts' may be integrated into at least one module and implemented as at least one processor, excluding 'a module' or 'a part' that needs to be implemented as specific hardware.

Various elements and areas in the drawings re illustrated schematically. Accordingly, the technical idea of the disclosure is not limited by the relative sizes or intervals illustrated in the accompanying drawings.

Hereinafter, various example embodiments according to the disclosure will be described in greater detail with reference to the accompanying drawings.

FIG. 1 is a block diagram illustrating an example configuration of an electronic apparatus according to various embodiments.

An electronic apparatus 100 may include a memory 110, a communication interface (e.g., including communication circuitry) 120, a user interface (e.g., including interface circuitry) 130, a display 140, a sensor 150, and a processor (e.g., including processing circuitry) 160. In the electronic apparatus 100, some of the above components may be omitted, or other elements may be further included.

The electronic apparatus 100 may be, for example, and without limitation, a smartphone, a tablet PC, a PC, a smart TV, a mobile phone, a personal digital assistant (PDA), a laptop, a media player, a micro server, a global positioning system (GPS) apparatus, an electronic book terminal, a terminal for digital broadcasting, a navigation, a kiosk, an MP3 player, a digital camera, a wearable apparatus, a home appliance, and other mobile or non-mobile computing apparatuses, but is not limited thereto.

The memory 110 may store at least one instruction regarding the electronic apparatus 100. The memory 110 may store an operating system (O/S) for operating the electronic apparatus 100. Also, the memory 110 may store various kinds of software programs or applications for making the electronic apparatus 100 operate according to the various embodiments of the disclosure. Further, the memory 110 may include a semiconductor memory such as a flash memory or a magnetic storage medium such as a hard disk, etc.

For example, the memory 110 may store various kinds of software modules for making the electronic apparatus 100 operate according to the various embodiments of the disclosure, and the processor 160 may control the operation of the electronic apparatus 100 by executing the various kinds of software modules stored in the memory 110. That is, the memory 110 may be accessed by the processor 160, and reading/recording/correction/deletion/update, etc. of data by the processor 160 may be performed.

Meanwhile, in the disclosure, the term memory 110 may include the memory 110, a ROM (not shown) inside the processor 160, a RAM (not shown), or a memory card (not shown) (e.g., a micro SD card, a memory stick) installed on the electronic apparatus 100.

The communication interface 120 includes circuitry, and it is a component that can communicate with an external apparatus and a server. The communication interface 120 may perform communication with an external apparatus or a server based on a wired or wireless communication method. In particular, the communication interface 120 may transmit and receive data by performing communication with a wearable apparatus 200. In this case, the communication interface 120 may include a WI-FI module (not shown), a Bluetooth module (not shown), an infrared (IR) module, a local area network (LAN) module, an Ethernet module, etc. Here, each communication module may be implemented in the form of at least one hardware chip. A wireless communication module may include at least one communication chip that performs communication according to various wireless communication standards such as Zigbee, a Universal Serial Bus (USB), a Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), etc., other than the aforementioned communication methods. However, this is merely an example, and the communication interface 120 may use at least one communication module among various communication modules. The electronic apparatus 100 may receive user data by performing communication with the external apparatus 200 through the communication interface 120.

The user interface 130 may include various interface circuitry and is a component for receiving input of a user instruction for controlling the electronic apparatus 100. The user interface 130 may be implemented as a device such as a button, a touch pad, a mouse, and a keyboard, or implemented as a touch screen that can perform both of a display function and a manipulation input function. Here, a button may be various types of buttons such as a mechanical button, a touch pad, a wheel, etc. formed in any areas such as the front surface part, the side surface part, the rear surface part, etc. of the exterior of the main body of the electronic apparatus 100. The electronic apparatus 100 may acquire various user inputs through the user interface 130.

The display 140 may be implemented as a display including self-luminous elements, or a display including non-self-luminous elements and a backlight. For example, the display 140 may be implemented as displays in various forms such as, for example, and without limitation, a liquid crystal display (LCD), an organic light emitting diodes (OLED) display, light emitting diodes (LED), a micro LED, a mini LED, a plasma display panel (PDP), a quantum dot (QD) display, quantum dot light-emitting diodes (QLED), etc. Also, inside the display 140, driving circuits that may be implemented in forms such as an a-si TFT, a low temperature poly silicon (LTPS) TFT, an organic TFT (OTFT), etc., a backlight unit, etc. may also be included.

The sensor 150 may acquire information on the state of the electronic apparatus 100, the state of the surroundings of the electronic apparatus 100, or the state of the user. Specifically, the sensor 150 may include a sensor that can acquire the location information of the electronic apparatus 100 (e.g., a GPS sensor), a movement sensor that can acquire the movement information of the electronic apparatus 100 (e.g., a gyro sensor, an acceleration sensor, etc.), a sensor that can detect the environment information around the electronic apparatus 100 (e.g., a temperature sensor, a humidity sensor, a barometric pressure sensor, etc.), a sensor that can detect the user information of the electronic apparatus 100 (e.g., a blood pressure sensor, a blood sugar sensor, a pulse sensor, etc.), an image sensor for photographing the outside of the electronic apparatus 100, etc.

The processor 160 may include various processing circuitry and control the overall operations and functions of the electronic apparatus 100. For example, the processor 160 may be connected with the components of the electronic apparatus 100 including the memory 110, and may control the overall operations of the electronic apparatus 100 by executing at least one command stored in the memory 110 as described above.

The processor 160 may be implemented in various ways. For example, the processor 160 may be implemented, for example, and without limitation, as at least one of an application specific integrated circuit (ASIC), an embedded processor, a microprocessor, hardware control logic, a hardware finite state machine (FSM), or a digital signal processor (DSP). Meanwhile, in the disclosure, the term processor 160 may include, for example, and without limitation, a central processing unit (CPU), a graphic processing unit (GPU), a main processing unit (MPU), etc.

The processor 160 may include a user data analysis module 161, a context information acquisition module 162, a knowledge data generation module 163, a knowledge graph update module 164, and a service provision module 166. Each of the modules may include various processing circuitry and/or executable program instructions. For example, each of the plurality of modules according to the disclosure may be implemented as software modules or hardware modules, and in case the plurality of modules are implemented as software modules, the processor 160 may access the software modules by loading the software modules stored in the memory 110.

Figure 2:
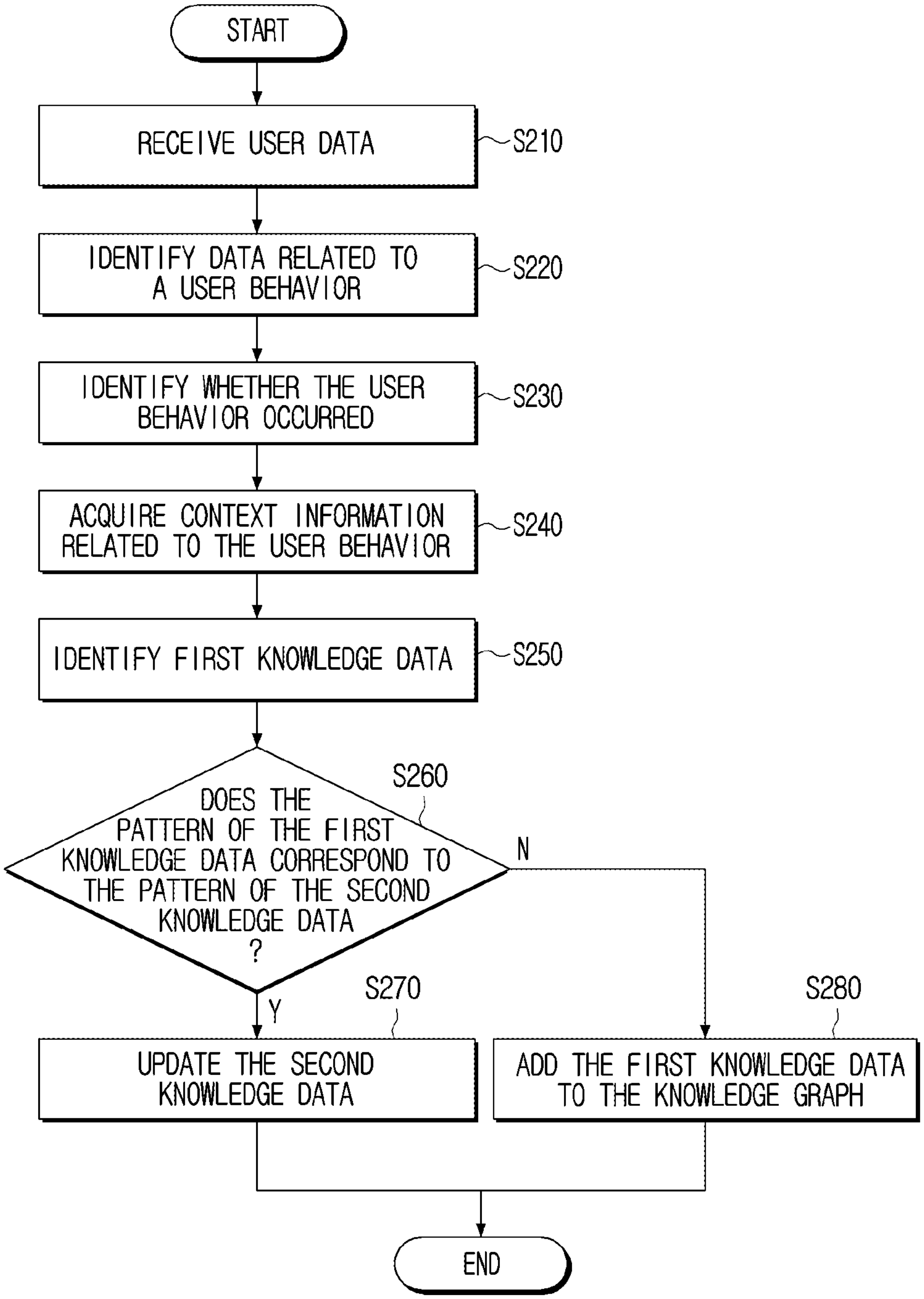
FIG. 2 is a flowchart illustrating an example method of updating a knowledge graph according to various embodiments.

Referring to FIG. 2, the user data analysis module 161 may receive user data from at least one external apparatus 200 through the communication interface 120 in operation S210. The external apparatus 200 may be an external sensor, an external server, an IoT apparatus, and a wearable apparatus such as a watch, glasses, a hair band, a ring, etc. equipped with a communication function and a data processing function. However, the disclosure is not limited thereto, and the external apparatus 200 may include all kinds of apparatuses that can transmit and receive data with the electronic apparatus 100 through a network.

The user data may refer, for example, to raw data or log history information wherein information regarding all situations that occur in and outside the apparatus related to the user (the electronic apparatus 100 or the external apparatus 200) is recorded according to time. For example, the user data may refer, for example, to data wherein sensing information received from an external sensor (e.g., a temperature and humidity sensor) in real time, GPS data, time information that events occurred such as the web access history of the user, the history of applications that the user uses frequently, etc., and the state of the apparatus (e.g.: the power, the CPU use rate, the memory use rate, etc.) are recorded together.

The user data may include data indicating operations of the apparatus related to the user. The data indicating operations of the apparatus may be collected in the apparatus, as the user uses the apparatus. In an embodiment, the data indicating operations of the apparatus may refer, for example, to log history information related to the operations of the apparatus. For example, the data indicating operations of the apparatus may include the web access history of the user who uses the apparatus, the history of applications that the user uses frequently in the apparatus, etc. among the aforementioned log history information. Also, the data indicating operations of the apparatus may refer, for example, to data indicating events, etc. that occur while the software in the apparatus is executed.

The user data may be data received from the external apparatus 200, but is not limited thereto, and it may include information that can be acquired at the electronic apparatus 100 such as the state information of the electronic apparatus 100, the information of applications that are being executed in the electronic apparatus 100, the information on user interactions input through the user interface 130, the information sensed through the sensor 150 included in the electronic apparatus 100, etc.

The user data analysis module 161 may identify the pattern of the user data. The user data analysis module 161 may identify data having a different pattern from the pattern of the user data. For example, the user data analysis module 161 may identify the pattern of the user data, and after the pattern is identified, if user data having a different pattern from the identified pattern is received, the user data analysis module 161 may identify the user data having a different pattern from the pattern of the user data as data related to an user behavior in operation S220. The user data analysis module 161 may identify the pattern of received user data, and identify data having a different pattern from the identified pattern in the received user data as data related to an user behavior.

The pattern of the user data may refer, for example, to the average value of the data, the peak value of the data, the cycle of the data, etc. However, the disclosure is not limited thereto, and the pattern may refer, for example, to various data characteristics.

The pattern of the user data may include the average value or a specific value of the data, and the user data analysis module 161 may identify data having a value that is five times higher or more than the average value or a specific value of the data as sensor data. The specific value may vary according to the type of the user data, and it may be a value stored in advance in the memory 110.

According to an embodiment, the user data analysis module 161 may identify data related to a user behavior by utilizing an artificial intelligence technology (e.g., machine learning). For example, an artificial intelligence model may learn pre-received user data, and identify the pattern of the pre-received user data. Here, the trained artificial intelligence model that received input of the received user data may compare the pattern of the input user data and the pre-identified pattern of the user data, and output similarity.

The user data analysis module 161 may input the received user data into the trained artificial intelligence model and acquire similarity with the pre-identified user data pattern, and identify user data of which output similarity is smaller than or equal to a predetermined value as data related to a user behavior.

Based on the data related to an user behavior, the user behavior identification module 162 may identify whether an user behavior occurred in operation S230. For example, based on the data related to a user behavior identified through the user data, the user behavior identification module 162 may identify a user behavior or whether a user behavior occurred. Based on the data related to a user behavior such as the type of the apparatus that acquired the data, the type of the data, the location wherein the data was acquired, the time when the data was acquired, or the pattern of the data, etc., the user behavior identification module 162 may identify whether a user behavior occurred. The data may be data related to the user data or a user behavior identified through the user data.

Figure 3:
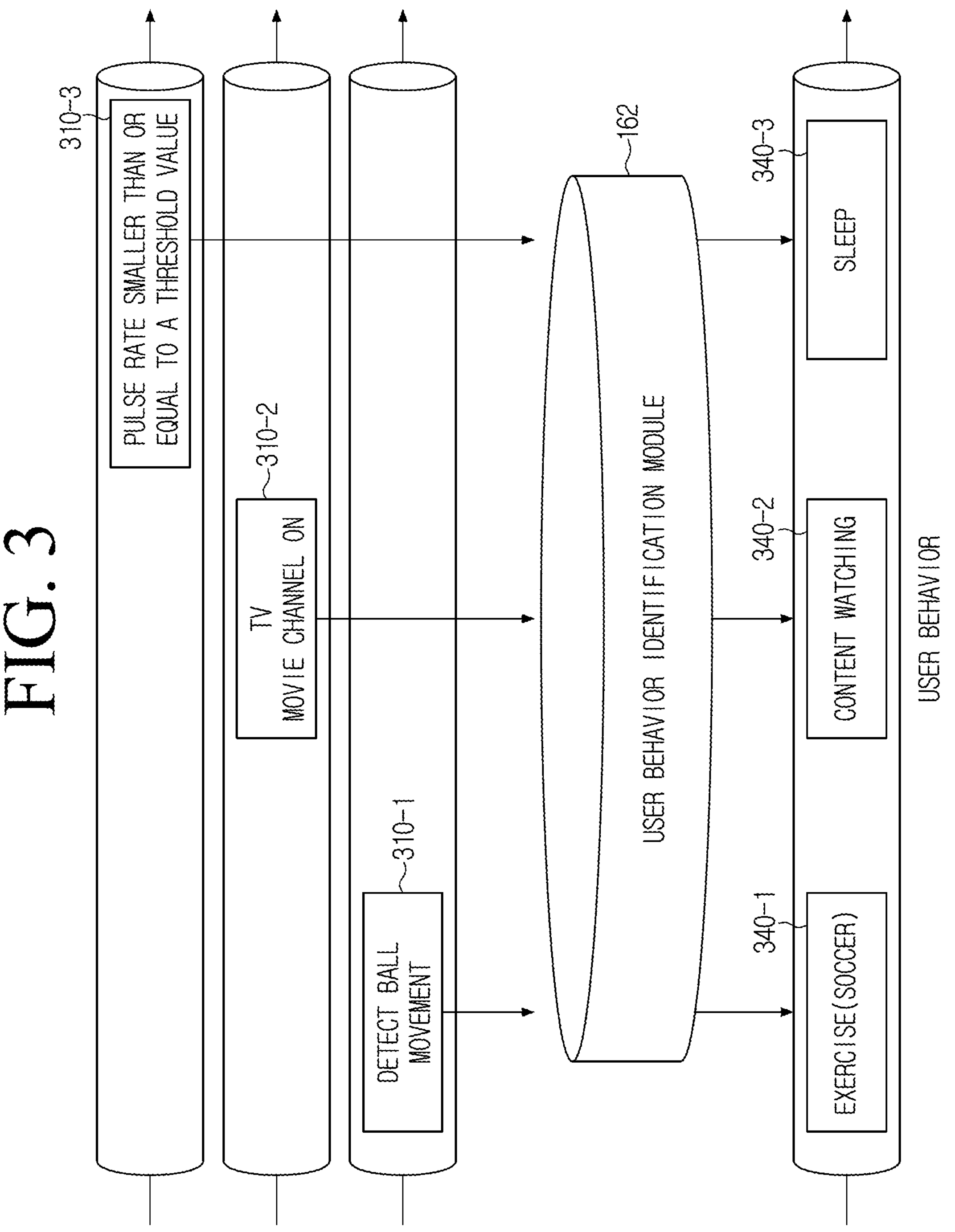
FIG. 3 is a diagram illustrating an example method of acquiring context information according to various embodiments.

For example, as illustrated in FIG. 3, if the type of the acquired data is detection of a ball movement 310-1 (e.g., movement information of a ball acquired through an acceleration sensor housed inside a soccer ball), the user behavior identification module 162 may identify that “exercise (soccer)” 340-1 occurred. Alternatively, in case the acquired data is “movie channel ON on TV” 310-2, the user behavior identification module 162 may identify that “content WATCHING” 340-2 occurred. If the user’s “heart rate” received from the pulse sensor “is smaller (e.g., less) than or equal to the threshold value” 310-3, the user behavior identification module 162 may identify that “sleep” 340-3 occurred.

When the user behavior is identified, the context information acquisition module 163 may acquire context information related to the user behavior in operation S240. The context information may include information on the time, the location, or the weather related to the user behavior, but is not limited thereto.

Figure 4:
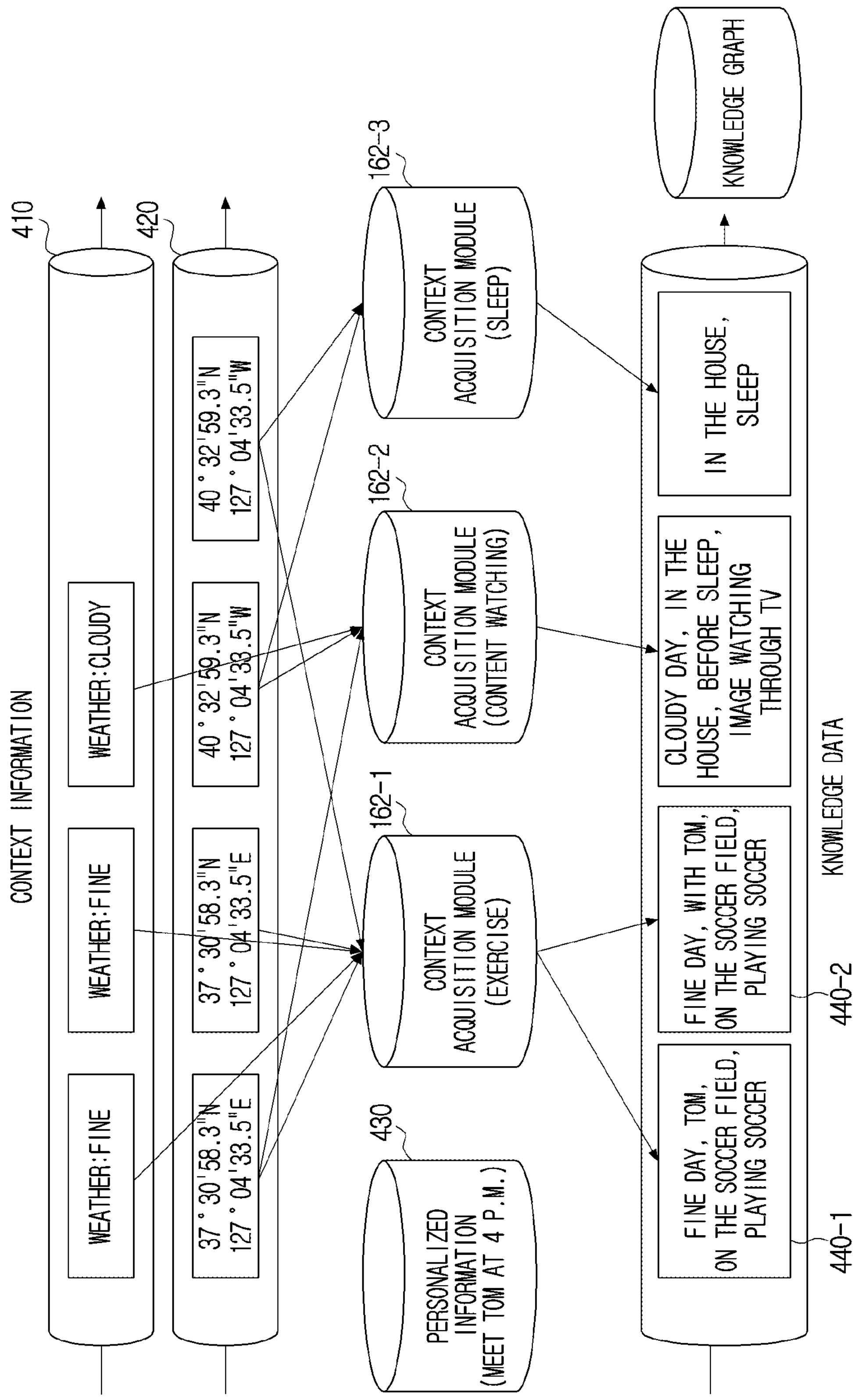
FIG. 4 is a diagram illustrating an example knowledge graph according to various embodiments.

The context information acquisition module 163 may acquire different context information according to an identified user behavior. The context information may include weather information 410 or location information 420, but is not limited thereto. For example, as illustrated in FIG. 4, in case an identified user behavior is "content WATCHING through TV," the context information acquisition module 163 may acquire information on the outside weather, the WATCHING time, or the WATCHING place. In case an identified user behavior is "exercise," the context information acquisition module 163 may acquire information on the outside weather or the exercising place. In case an identified user behavior is "sleep," the context information acquisition module 163 may acquire information on the sleeping place. The context information may be information that the electronic apparatus 100 received from an external apparatus (e.g., location information, weather information), but is not limited thereto, and it may be information that the electronic apparatus 100 acquired by itself (e.g., date, day, and time information).

Types of context information related to user behaviors may be stored in the memory 110. Alternatively, the context information acquisition module 163 may receive the type of the context information from the external apparatus 200 or an external server. For example, if a user behavior is identified, the context information acquisition module 163 may request information on the type of the context information related to the user behavior to the external apparatus 200 or the external server, and the context information acquisition module 163 may receive the information on the type of the context information related to the user behavior from the external apparatus 200 or the external server.

The context information acquisition module 163 may acquire context information related to a user behavior from the sensor 150 of the electronic apparatus 100, the external apparatus 200, or the external server. For example, in case a context related to a user behavior is "the location of the electronic apparatus 100" or "the location of the external apparatus 200," the context information acquisition module 163 may acquire the location information of the electronic apparatus 100 or the external apparatus 200 from the GPS sensor of the electronic apparatus 100 or the GPS sensor of the external apparatus 200 (e.g., a wearable apparatus). The context information acquisition module 163 may acquire weather information from the external server storing weather information.

The time when the context information acquisition module 163 acquires context information may vary according to an identified user behavior. Information on a time period wherein context information according to an identified user behavior is acquired may be stored in advance in the memory 110, but is not limited thereto, and the context information acquisition module 163 may acquire information on a time period wherein context information according to an identified user behavior is acquired from the external apparatus 200 or the server 300. As illustrated in FIG. 4, a time period wherein the context information acquisition module 163 acquires context information may vary according to an identified user behavior. For example, in case an identified user behavior is "exercise," the context information acquisition module 162-1 related to exercise may acquire context information for "two hours." In case an identified user behavior is "content WATCHING through TV," the context information acquisition module 162-2 related to content WATCHING may acquire context information (e.g., location information) for "30 minutes." In case an identified user behavior is "sleep," the context information acquisition module 162-3 related to sleep may acquire context information for "one hour."

As described above, the context information acquisition module 163 selectively acquires context information related to an identified user behavior without acquiring all context data, and can thereby acquire only data necessary for generating a knowledge graph among a vast amount of data, and minimize and/or reduce unnecessary data storing and processing.

The knowledge data identification module 164 may identify the first knowledge data indicating relevance among information on a user behavior, the context information, and personalized information stored in the memory 110 in operation S250 The first knowledge data may be expressed in a resource description framework (RDF) form making each of the information on a user behavior, the context information, and the personalized information as an entity (or a node) and indicating the correlation (or the edge) of each entity, or expressed in an ontology form, or expressed as data in a knowledge graph form.

The personalized information may refer, for example, to personal information of the user of the electronic apparatus 100, and include the user's life pattern, schedule, or message information stored in the memory 110, but is not limited thereto, and it may refer, for example, to various kinds of information related to the user. For example, as illustrated in FIG. 4, if personalized information 430 such as "meet Tom on 4 P.M." is stored in the memory 110, and it is identified that the user is "playing soccer," the knowledge data identification module 164 may identify that the user is "fine day, playing soccer with Tom" 440-1, 440-2.

Meanwhile, the knowledge data identification module 164 may identify knowledge data having the same user behavior pattern at least once, and in case a plurality of knowledge data having the same user behavior pattern is continuously identified, the knowledge data identification module 164 may not store knowledge data excluding the knowledge data identified first in the memory 110, or may not use the knowledge data for updating the knowledge graph. The knowledge data identification module 164 may merge a plurality of knowledge data having the same user behavior pattern and identify it as one knowledge data. For example, as illustrated in FIG. 4, the knowledge data 440-1, 440-2 including the information "fine day, playing soccer with Tom" may be identified twice continuously, and the knowledge data 440-2 excluding the knowledge data 440-1 identified first may not be stored in the memory 110.

In the past, a knowledge graph was generated by collecting and analyzing data for generating a knowledge graph at an external server, and accordingly, there was a problem that sensitive personal information had to be transmitted to the server for generating a knowledge graph to which personalized information was reflected. However, according to the disclosure, data for generating a knowledge graph is collected at the electronic apparatus 100 that the user is using, but not an external server, and a knowledge graph is generated by additionally using personalized information stored in the memory 110, and accordingly, there is an effect that an optimized/improved knowledge graph for each individual can be generated without having to transmit sensitive personal information to an external server separately.

Knowledge data may refer, for example, to data processed for generating a knowledge graph. For example, user data may include data indicating an operation of the apparatus, and in knowledge data, user data is made as knowledge, and accordingly, the Subject-Predicate-Object indicated in a knowledge graph form may be expressed in a text form.

A knowledge graph may refer, for example, to data generated as specific information is structuralized in an ontology form according to a specific standard. For example, specific information may be expressed in a Resource Description Framework (RDF) form. Information expressed in an RDF form may be expressed in a graph form of Node-Edge-Node. Here, the Node-Edge-Node may refer, for example, to the Subject-Predicate-Object.

In an embodiment, a knowledge graph may refer, for example, to data generated in a graph form, as specific information such as entities in the real world and the relation among the entities is structuralized in an ontology form according to a specific standard. In an embodiment, a knowledge graph may include components such as entities, edges, and attributes. An entity may refer, for example, to an object named in the real world. For example, an entity may refer, for example, to a person's name such as "Tom" and "James Cameron," a name of a sport such as "baseball," a name of an application such as "Youtube," etc. In an embodiment, an entity may refer, for example, to a node inside the aforementioned knowledge graph. In an embodiment, an edge may include a component that connects entities, and it may indicate a connected relation among entities. For example, a "baseball" entity and an "interest" entity may be connected through an edge. In the disclosure, a relation among entities inside a knowledge graph may refer, for example, to a connected relation among the nodes inside the knowledge graph. In an embodiment, an attribute may refer, for example, to specific information regarding an entity. That is, an attribute may refer, for example, to a method of expressing a specific entity. For example, in case a "baseball" entity and an "interest" entity are connected through an edge indicating a type, the type of the "baseball" entity may be classified as "interest." Here, the type may refer, for example, to the attribute for the "baseball" entity.

A knowledge graph stored in the memory 110 may refer, for example, to a knowledge graph indicating a user behavior pattern. A knowledge graph may be generated based on knowledge data indicating a correlation among entities. Here, the knowledge data may include at least one entity information comprising the knowledge graph and information regarding a relation between the at least one entity. For example, in case the user of the electronic apparatus 100 performs a specific behavior in a specific situation, the entity indicating the specific situation and the entity indicating the specific behavior may be connected. The knowledge graph may be implemented in a semantic form as a plurality of knowledge data (e.g., data wherein the entity indicating the specific situation and the entity indicating the specific behavior are connected in an RDF structure) is connected in a time series manner.

The knowledge data identification module 164 may generate the first knowledge data by additionally using common sense information stored in the memory 110. For example, in case an identified user is WATCHING a content on 11 P.M. of Monday, the knowledge data identification module 164 may identify the first knowledge data as "Saturday, the user watches a content before sleep" using information on the general sleeping time (e.g., 24 A.M.-7 A.M.) stored in the memory 110.

The knowledge graph update module 165 may compare the generated first knowledge data and the second knowledge data included in the knowledge graph stored in the memory 110, and update the knowledge graph. For example, the knowledge graph update module 165 may identify whether the pattern of the first knowledge data corresponds to the pattern of the second knowledge data in operation S260. Specifically, the knowledge data may include information related to a user's behavior, and the pattern of the knowledge data may refer, for example, to the user's behavior pattern included in the knowledge data. Here, the pattern of the knowledge data (or the user's behavior pattern) may refer, for example, to the relation among the subject-predicate-object inside the knowledge data.

For example, if information included in the first knowledge data is "Saturday, watch a content before sleep," and information included in the second knowledge data is "Sunday, the user watches a content before sleep," the relation among the subject-predicate-object of the first knowledge data and the second knowledge data is "the user-watches before sleep-a content," and thus the knowledge graph update module 165 may identify that the patterns of the first knowledge data and the second knowledge data correspond.

If the pattern of the first knowledge data corresponds to the pattern of the second knowledge data in operation S260-Y, the knowledge graph update module 165 may update the second knowledge data using information not included in the second knowledge data among the information included in the first knowledge data in operation S270. For example, the knowledge graph update module 165 may update the entity information of the second knowledge data using entity information not included in the second knowledge data among the entity information included in the first knowledge data.

For example, in case the information included in the first knowledge data is "the user watches a content before sleep on Sunday (or Nov. 21, 2021)," and the information included in the second knowledge data is "the user watches a content before sleep on Saturday (or Nov. 20, 2021)," the entity information not included in the second knowledge data among the information included in the first knowledge data may be "Sunday (or Nov. 21, 2021)." Here, the knowledge graph update module 165 may update the entity information "Saturday (or Nov. 20, 2021)" regarding the day of the second knowledge data to the entity information "weekend (or Nov. 21, 2021)" using the entity information "Sunday (or Nov. 21, 2021)" regarding the day. Here, the updated knowledge graph may include information "watch a content before sleep on weekends (or Nov. 21, 2021)."

If the pattern of the first knowledge data does not correspond to the pattern of the second knowledge data in operation S260-N, the knowledge graph update module 165 may add the first knowledge data to the knowledge graph in operation S280. Here, the specific method will be described in greater detail below with reference to FIG. 5.

Figure 5:
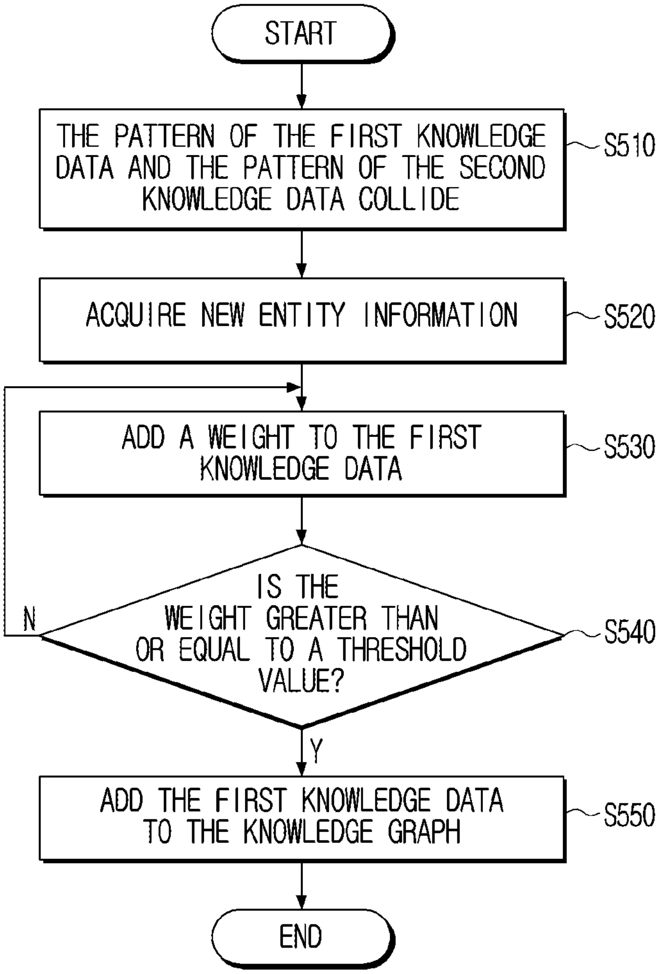
FIG. 5 is a flowchart illustrating an example method of updating a knowledge graph according to various embodiments.

Referring to FIG. 5, the knowledge graph update module 165 may identify that the pattern of the first knowledge data and the pattern of the second knowledge data do not correspond (e.g., "collide") in operation S510.

Figure 6A:
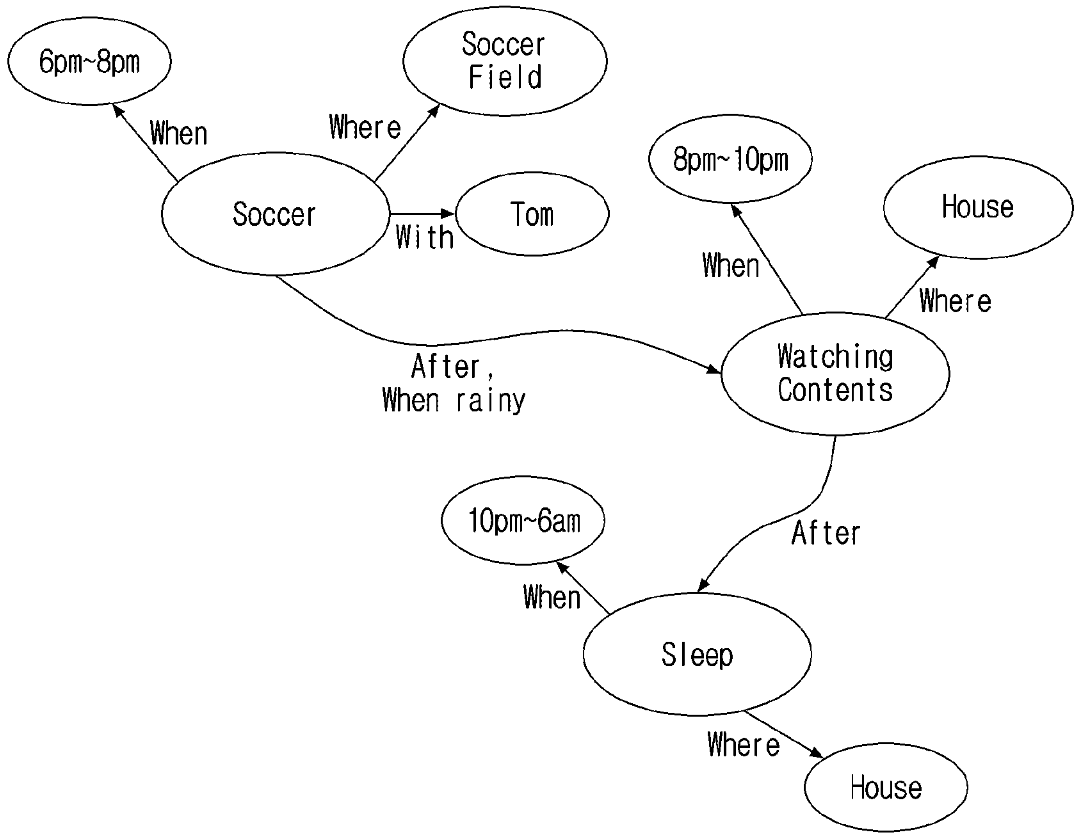
FIG. 6A, 6B and FIG. 6C are diagrams illustrating an example method of updating a knowledge graph according to various embodiments.

For example, in case information included in the first knowledge data is "exercise before sleep," and information included in the second knowledge data is "watch a content before sleep" as illustrated in FIG. 6A, the subject-predicate-object information of the first knowledge data is "the user-does-exercise," and the subject-predicate-object information of the second knowledge data is "the user-watches-a content" under the same "before sleep" condition, and thus the knowledge graph update module 165 may identify that the pattern of the first knowledge data does not correspond to the pattern of the second knowledge data.

If it is identified that the pattern of the first knowledge data and the pattern of the second knowledge data do not correspond, the knowledge graph update module 165 may add a weight to the first knowledge data. for example, the knowledge graph update module 165 may acquire new entity information for updating the first knowledge data in operation S520. Here, the new entity information may refer, for example, to entity information for an attribute not included in the first knowledge data. The new entity information may refer, for example, to new entity information for an attribute not included in the second knowledge data.

The knowledge graph update module 165 may acquire new entity information using common sense information stored in the memory 110 in operation S520. For example, in the second knowledge data information, attribute information for the "weather" may not be included. In this case, the knowledge graph update module 165 may identify the outside weather when a user behavior corresponding to the first knowledge data occurred as new entity information.

Figure 6B:
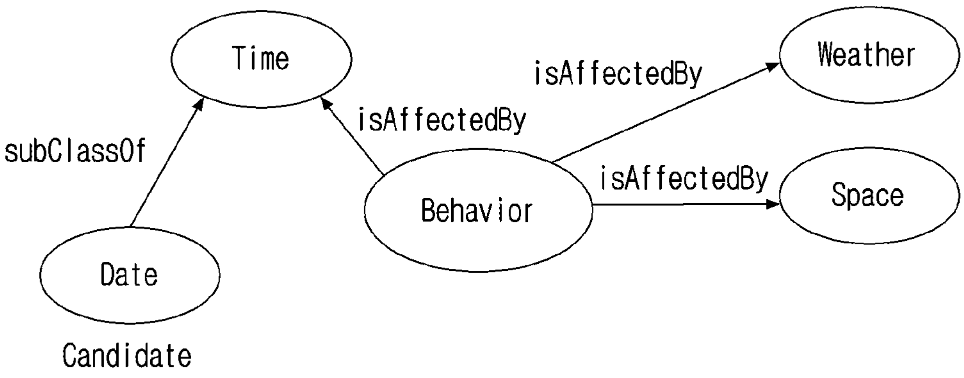

For example, for identifying new entity information, the knowledge graph update module 165 may refer to a common sense knowledge graph including attribute information related to a user behavior as illustrated in FIG. 6B. Here, the common sense knowledge graph may be stored in advance in the memory 110. Referring to FIG. 6B, attribute information related to a user behavior may include "time, date, space, weather," but is not limited thereto. The knowledge graph update module 165 may compare the attribute information related to a user behavior included in the common sense knowledge graph with the first knowledge data and the second knowledge data, and identify "weather" as an attribute not included in the first knowledge data or the second knowledge data, and identify it as new entity information. Accordingly, the knowledge graph update module 165 may acquire "before sleep, outside weather information (e.g., fine) during exercise," and update the first knowledge data using the acquired outside weather information (new entity information). Here, the information included in the updated first knowledge data may be "when the weather is fine, before sleep, exercise."

The knowledge graph update module 165 may add a weight to the updated first knowledge data in operation S530. Here, the added weight value may refer, for example, to a predetermined (e.g., specified) value, or the number of times of occurrence (or the frequency of occurrence) of an behavior included in the first knowledge data (the first behavior) compared to the number of times of occurrence (or the frequency of occurrence) of an behavior included in the second knowledge data (the second behavior). Also, the basic weight of the second knowledge data may be 1. For example, if the number of times of occurrence of the second behavior is twice, and the number of times of occurrence of the first behavior is once, the weight of the second behavior may be 1, and the weight of the first behavior may be 0.5 (once/twice). If the number of times of occurrence of the second behavior is twice, and the number of times of occurrence of the first behavior is twice, the weight of the second behavior may be 1, and the weight of the first behavior may be 1.

The knowledge graph update module 165 may identify whether the weight added to the updated first knowledge data is greater than or equal to a threshold value in operation S540.

If the weight added to the first knowledge data is less than than the threshold value in operation S540-N, the knowledge graph update module 165 may store the first knowledge data to which the weight was added in the memory 110. Afterwards, when the first user behavior having the same entity information as the first knowledge data is identified again, the knowledge graph update module 165 may add the modified weight value to the first knowledge data, and thereby update the first knowledge data in operation S530.

Here, the threshold value may be a predetermined value, and it may be a value input by the user through the user interface 130.

If the weight added to the first knowledge data is greater than or equal to the threshold value in operation S540-Y, the knowledge graph update module 165 may add the first knowledge data to the knowledge graph in operation S550.

Figure 6C:
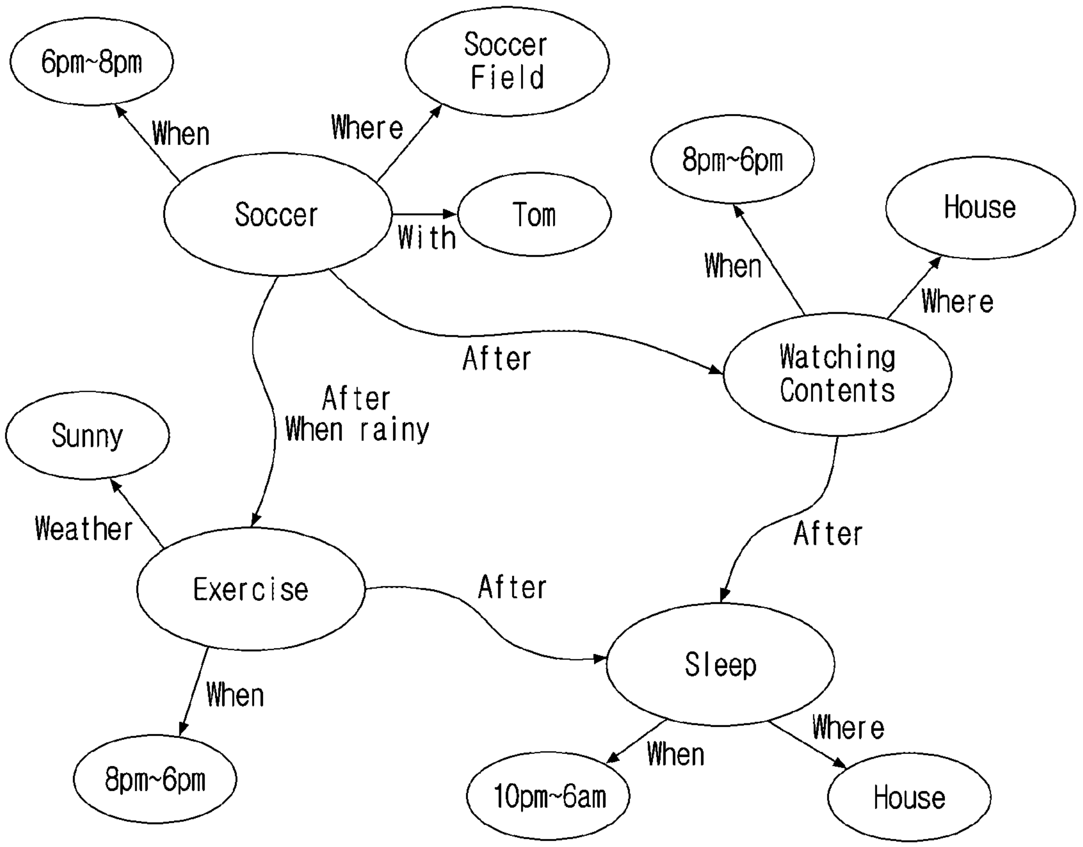

For example, if the updated first knowledge data is "when the weather is fine, before sleep, exercise," and the weight added to the updated first knowledge data is 2, and the threshold value is 2, the weight added to the updated first knowledge data may be greater than or equal to the threshold value. Accordingly, the knowledge graph as illustrated in FIG. 6A may be updated to the knowledge graph as illustrated in FIG. 6C using the first knowledge data.

The service provision module 166 may provide a recommendation service to the user based on the knowledge graph stored in the memory 110 (or the updated knowledge graph). The service may include, for example, a broadcasting service, a content sharing service, a content provision service, a power management service, a game provision service, a chatting service, a document drafting service, a search service, a dictionary information provision service, a call service, a photograph shooting service, a transportation means recommendation service, a video play service, or an information provision service, but is not limited thereto. A specific method for the service provision module 166 to provide a recommendation service will be described in greater detail below with reference to FIGS. 7A and 7B.

For example, the service provision module 166 may provide a recommendation service corresponding to a user behavior identified through the user behavior identification module 162. Then, based on the identified user behavior and the knowledge graph stored in the memory 110, the service provision module 166 may identity an expected user behavior, and provide a recommendation service for the expected user behavior.

Figure 7A:
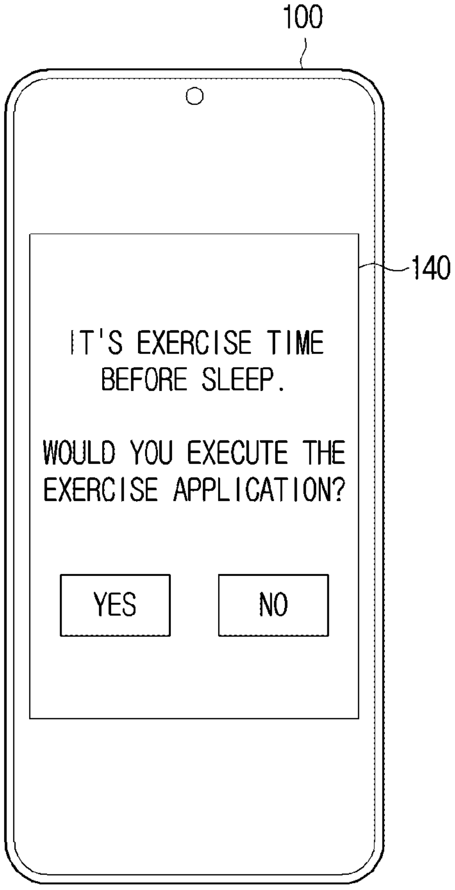
FIG. 7A and FIG. 7B are diagrams illustrating an example method of providing a recommendation service to a user according to various embodiments.

For example, in case an identified user behavior (or an expected user behavior) is "exercise before sleep," as illustrated in FIG. 7A, the electronic apparatus 100 may control the display 140 to display a UI checking whether an exercise application is executed when it becomes "the exercise time before sleep." However, the disclosure is not limited thereto, and the electronic apparatus 100 may execute an exercise application when it becomes the time for the user to exercise before sleep without providing a separate UI.

Figure 7B:
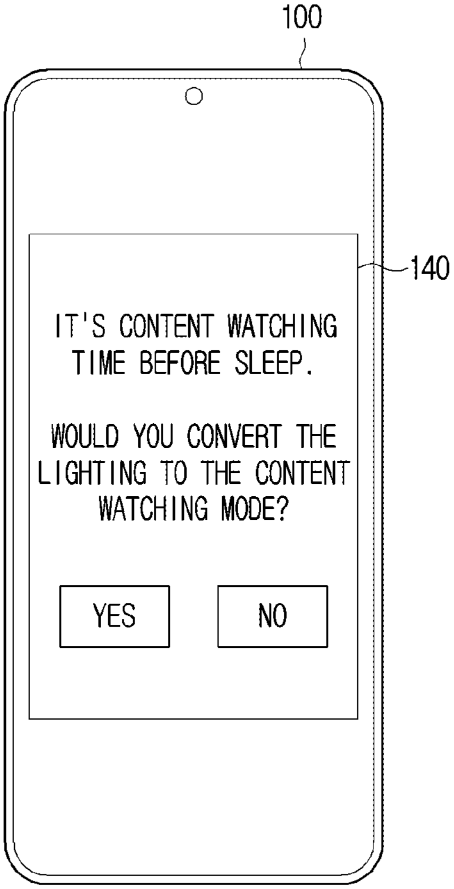

In case an identified current user behavior (or an expected user behavior) is "content WATCHING," as illustrated in FIG. 7B, the service provision module 166 may control the display 140 to display a UI for controlling external apparatuses related to content WATCHING such as a lighting and a speaker, etc. connected with the electronic apparatus 100. Alternatively, the service provision module 166 may control external apparatuses related to content WATCHING to be in a state appropriate for content WATCHING, without displaying a separate UI.

Figure 8:
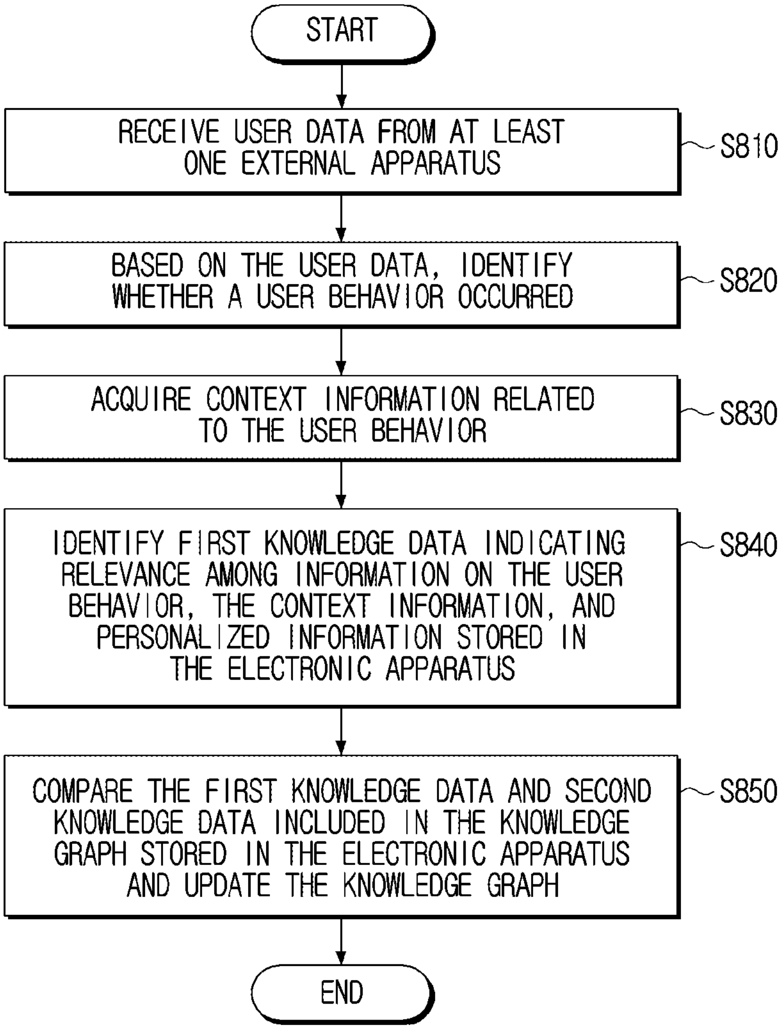
FIG. 8 is a flowchart illustrating an example method of controlling an electronic apparatus according to various embodiments.

FIG. 8 is a diagram illustrating an example method of controlling the electronic apparatus 100 according to various embodiments.

The electronic apparatus 100 may receive user data from at least one external apparatus in operation S810.

Based on the user data, the electronic apparatus 100 may identify whether a user behavior occurred in operation S820. The electronic apparatus 100 may identify the pattern of the user data, identify data having a different pattern from the pattern of the user data as data related to the user behavior, and identify whether the user behavior occurred based on the data related to the user behavior.

When the user behavior is identified, the electronic apparatus 100 may acquire context information related to the user behavior in operation S830.

The electronic apparatus 100 may identify first knowledge data indicating relevance among information on the user behavior, the context information, and personalized information stored in the electronic apparatus 100 in operation S840.

The electronic apparatus 100 may compare the first knowledge data and second knowledge data included in the knowledge graph stored in the electronic apparatus and update the knowledge graph in operation S850. The first knowledge data and the second knowledge data may include information regarding a relation between at least one entity information of the knowledge graph and the at least one entity.

Meanwhile, the term "part" or "module" used in the disclosure may include a unit implemented as hardware, software, or firmware, and may be interchangeably used with, for example, terms such as a logic, a logical block, a component, or a circuit. In addition, "a part" or "a module" may be a component including an integrated body or a minimum unit or a part of the component performing one or more functions. For example, a module may include an application-specific integrated circuit (ASIC).

The various embodiments of the disclosure may be implemented as software including instructions stored in machine-readable storage media, which can be read by machines (e.g.: computers). The machines refer to apparatuses that call instructions stored in a storage medium, and can operate according to the called instructions, and the apparatuses may include the electronic apparatus 100 according to the aforementioned embodiments. In case an instruction is executed by a processor, the processor may perform a function corresponding to the instruction by itself, or using other components under its control. An instruction may include a code that is generated by a compiler or a code executed an interpreter. A storage medium that is readable by machines may be provided in the form of a non-transitory storage medium. Here, the 'non-transitory' storage medium does not include signals, and is tangible, but may not indicate whether data is stored in the storage medium semi-permanently or temporarily.

According to an embodiment, the method according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Also, each of the components (e.g.: a module or a program) according to the various embodiments may be comprised of a single entity or a plurality of entities, and some sub-components among the aforementioned sub-components may be omitted, or different sub-components may be further included in the various embodiments. Alternatively or additionally, some components (e.g.: modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:

a communication interface comprising communication circuitry;

a memory including a knowledge graph including a plurality of knowledge data and at least one command; and at least one processor including processing circuitry connected with the memory and configured to individually or collectively control the electronic apparatus, wherein the at least one processor is configured, by executing the at least one command, to:

receive user data from at least one external apparatus through the communication interface, identify a pattern of the user data based on the user data, obtain a similarity between the pattern of the user data and a pattern of pre-stored user data by using an artificial intelligence model, wherein the artificial intelligence model is trained to compare a pattern of an input user data and a pre-identified pattern of a user data and output similarity, identify user data of which similarity is smaller than or equal to a predetermined value as data related to a user behavior, identify whether the user behavior occurred based on the data related to the user behavior, based on identifying the user behavior, selectively acquire context information related to the user behavior based on relevance to the identified user behavior, identify first knowledge data indicating relevance among information on the user behavior, the context information, and personalized information stored in the memory, and compare the first knowledge data and second knowledge data included in the knowledge graph and update the knowledge graph, wherein the first knowledge data and the second knowledge data include at least one entity information of the knowledge graph and information regarding a relation between the at least one entity.

2. The electronic apparatus of claim 1, wherein the at least one processor is configured to:

based on identifying that a pattern of the first knowledge data corresponds to a pattern of the second knowledge data, update the second knowledge data using information not included in the second knowledge data among the information included in the first knowledge data.

3. The electronic apparatus of claim 1, wherein the at least one processor is configured to:

based on identifying that a pattern of the first knowledge data and pattern of the second knowledge data not corresponding, apply a weight to the first knowledge data.

4. The electronic apparatus of claim 3, wherein the at least one processor is configured to:

identify new entity information for an attribute not included in the second knowledge data, update the first knowledge data using the new entity information, and apply a weight to the updated first knowledge data based on a number of times knowledge data of the same pattern as the updated first knowledge data is acquired.

5. The electronic apparatus of claim 4, wherein the electronic apparatus further comprises:

a user interface comprising interface circuitry, and the at least one processor is configured to:

receive input of a threshold value through the user interface, and based on the weight being greater than or equal to the threshold value, add the updated first knowledge data to the knowledge graph.

6. The electronic apparatus of claim 1, wherein the knowledge graph includes the plurality of knowledge data in a semantic form.

7. The electronic apparatus of claim 1, wherein the at least one processor is configured to:

provide recommendation information based on the knowledge graph and the context information.

8. A method of controlling an electronic apparatus, the method comprising:

receiving user data from at least one external apparatus;

identifying a pattern of the user data based on the user data, obtaining a similarity between the pattern of the user data and a pattern of pre-stored user data by using an artificial intelligence model, wherein the artificial intelligence model is trained to compare a pattern of an input user data and a pre-identified pattern of a user data and output similarity, identifying user data of which similarity is smaller than or equal to a predetermined value as data related to a user behavior, identifying whether the user behavior occurred based on the data related to the user behavior, based on identifying the user behavior, selectively acquiring context information related to the user behavior based on relevance to the identified user behavior;

identifying first knowledge data indicating relevance among information on the user behavior, the context information, and personalized information stored in the electronic apparatus; and comparing the first knowledge data and second knowledge data included in the knowledge graph stored in the electronic apparatus and updating the knowledge graph, wherein the first knowledge data and the second knowledge data include at least one entity information of the knowledge graph and information regarding a relation between the at least one entity.

9. The method of claim 8, wherein the updating the knowledge graph comprises:

based on identifying that a pattern of the first knowledge data corresponds to a pattern of the second knowledge data, updating the second knowledge data using information not included in the second knowledge data among the information included in the first knowledge data.

10. The method of claim 8, wherein the updating the knowledge graph comprises:

based on identifying that a pattern of the first knowledge data and a pattern of the second knowledge data do not correspond, applying a weight to the first knowledge data.

11. The method of claim 10, wherein the updating the knowledge graph comprises:

identifying new entity information for an attribute not included in the second knowledge data;

updating the first knowledge data using the new entity information; and applying a weight to the updated first knowledge data based on a number of times that knowledge data of the same pattern as the updated first knowledge data is acquired.

12. The method of claim 11, further comprising:

receiving input of a threshold value, and the updating the knowledge graph comprises:

based on the weight being greater than or equal to the threshold value, adding the updated first knowledge data to the knowledge graph.

13. The method of claim 8, wherein the knowledge graph stores the plurality of knowledge data in a semantic form.

* * * * *